United States Patent
Rickheim

(10) Patent No.: US 6,301,867 B1
(45) Date of Patent: Oct. 16, 2001

(54) BED KNIFE BLADE CONSTRUCTION FOR REEL MOWERS

(75) Inventor: Gerald E. Rickheim, Waukesha, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/521,497

(22) Filed: Mar. 9, 2000

(51) Int. Cl.[7] .................................................. A01D 34/52
(52) U.S. Cl. ................................................. 56/294; 56/249
(58) Field of Search ................................. 56/7, 249, 249.5, 56/289, 294, 250, DIG. 20, DIG. 17; 30/340, 329; 83/698.71; 407/66, 113

(56) References Cited

U.S. PATENT DOCUMENTS

| | | | |
|---|---|---|---|
| 905,591 | * 12/1908 | Rowe | 56/294 |
| 1,044,735 | * 11/1912 | Bond | 56/294 |
| 1,903,183 | * 3/1933 | Jessug | 56/294 |
| 3,822,625 | 7/1974 | Obenshain . | |
| 4,680,922 | 7/1987 | Arnold . | |
| 4,909,677 | * 3/1990 | Noguchi et al. | 407/66 |
| 5,170,613 | 12/1992 | Heise et al. . | |
| 5,203,151 | 4/1993 | Mills . | |

* cited by examiner

Primary Examiner—Robert E. Pezzuto
Assistant Examiner—Meredith Petravick
(74) Attorney, Agent, or Firm—Joseph M. Lafata; Harness, Dickey & Pierce, PLC

(57) ABSTRACT

A bed knife blade assembly for a reel-type lawn mower having a frame rotatably supporting a cutting reel. The bed knife blade assembly comprises a clamp plate having a flange with a locking surface, and a blade insert having a tab cooperating with the locking surface to restrict movement of the blade insert relative to the clamp plate. The clamp plate is adapted to be coupled to the frame such that the flange biasedly engages the tab to further restrict movement of the blade insert relative to the clamp plate.

13 Claims, 3 Drawing Sheets

BED KNIFE BLADE CONSTRUCTION FOR REEL MOWERS

BACKGROUND OF THE INVENTION

1. Technical Field

The present invention generally pertains to turf care equipment, such as lawn mowers and the like. More particularly, the present invention relates to a bed knife blade for a reel-type lawn mower.

2. Discussion

Commercial turf care equipment often employ reel-type lawn mowers for mowing golf greens. These reel-type mowers typically include a frame having a rotatably mounted cutting reel and a bed knife blade positioned in close proximity to the cutting reel. As the cutting reel is rotated, the blades of grass projecting between the cutting reel and the bed knife blade are cut at a desired height. In order to repeatedly cut blades of grass in this manner, it is advantageous to maintain sharp edges on both the cutting reel blades and the bed knife blade for as long a duration as possible. Accordingly, most bed knife blades are constructed from materials such as heat treated high carbon steel in order to maintain a sharp edge over time.

Unfortunately, even though the bed knife is heat treated, the blade typically requires frequent sharpening and eventual replacement. Because the entire conventional bed knife blade is constructed from high carbon steel, manufacture and replacement of such a blade is expensive. Specifically, costly carbide cutting tools are required to rough machine a hot formed, high carbon steel blank. The blank is next heat treated and ground on two surfaces to produce a knife edge.

In addition to high manufacturing process costs, the current bed knife blade design is also costly to manufacture due to the type of raw material which must be used. Specifically, in order to resist impact and bending loads at the mounting location, material toughness is required. Furthermore, to provide a long lasting cutting edge, high hardness is beneficial. Currently, expensive steel alloys exhibiting both toughness and hardenability are selected for use in this application.

SUMMARY OF THE INVENTION

Accordingly, it is an object of the present invention to provide a bed knife blade assembly having an economically advantageous replaceable blade insert.

It is another object of the present invention to maintain the current ease of sharpening and/or replacement of the bed knife blade assembly.

The present invention pertains to a bed knife blade assembly for a reel mower having a frame rotatably supporting a cutting reel. The bed knife blade assembly comprises a clamp plate having a flange with a locking surface, and a blade insert having a tab cooperating with the locking surface to restrict movement of the blade insert relative to the clamp plate. The clamp plate is adapted to be coupled to the frame such that the flange biasingly engages the tab to further restrict movement of the blade insert relative to the clamp plate.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
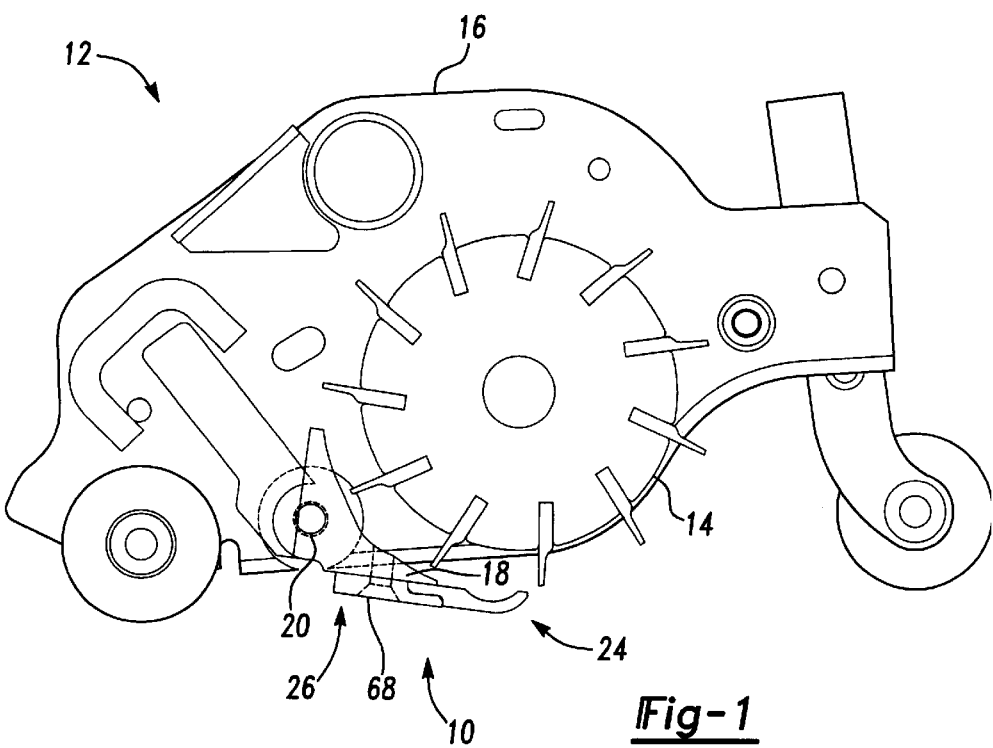
FIG. 1 is a side elevational view of an exemplary reel mower having a bed knife constructed in accordance with the teachings of the present invention.

With initial reference to FIG. 1, a bed knife blade constructed in accordance with the teachings of an embodiment of the present invention is generally identified at reference numeral 10. The bed knife blade 10 is shown operatively associated with an exemplary mower 12 having a cutting reel 14 rotatably mounted to a frame 16. A backing plate 18 is also coupled to the frame 16 for receiving and mounting the bed knife blade assembly 10 thereto. An adjustment mechanism 20 cooperates with the frame 16 and the backing plate 18 for positioning the bed knife blade assembly 10 relative to the cutting reel 14. One skilled in the art will appreciate that proper cutting or shearing of grass blades is accomplished by maintaining a minimal clearance between the rotating cutting reel 14 and the bed knife blade assembly 10. Specifically, the cutting reel 14 includes a plurality of helical blades providing individual shear interfaces along the entire length of bed knife blade assembly 10.

As mentioned earlier, proper function of the mower 12 also depends on maintaining the sharpness of the helical blades and the bed knife blade 10. The longevity of blade sharpness depends on a variety of factors including cutting edge hardness and mower usage. As is commonly known, the carbon content of steel alloys may be increased for hardenability purposes. However, a trade-off generally exists whereby an increase in material hardenability results in a decrease in material toughness. However, certain steel alloys exist which exhibit high hardenability and adequate toughness. Unfortunately, these materials are expensive and difficult to machine in their annealed state, let alone after hardening.

Based on the aforementioned limitations, a standard bed knife blade is created by first hot forming a blank. Subsequently, the blank is rough machined. Finish machining occurs by drilling and counter-sinking holes in a portion of the blank. At least a portion of the blank is heat treated and subsequently ground to form a cutting edge.

With continued reference to FIG. 1, the bed knife blade assembly 10 of the present invention incorporates a multi-piece design including a blade insert 24 and a clamp plate 26. The clamp plate 26 functions to couple the blade insert 24 to the backing plate 18 of the mower 12 but performs no cutting function. Accordingly, the clamp plate 26 is preferably constructed from a low cost, easily machined material exhibiting impact resistance and toughness. On the other hand, because the blade insert 24 cuts the grass and does not provide a mounting function, it is preferably constructed from a high carbon steel capable of achieving high hardness when heat treated. The hardened portion of the blade insert 24 is subsequently ground to a knife edge for cutting the blades of grass.

Figure 2:
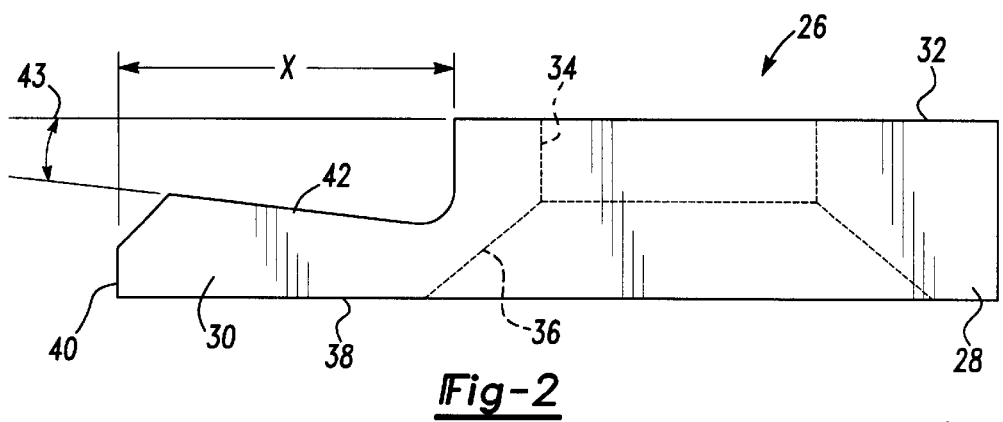
FIG. 2 is a side elevational view of a clamp plate of the present invention.

With reference to FIG. 2, the clamp plate 26 is an elongate structure having a body 28 and a flange 30 extending a distance "X" therefrom. The body 28 includes a mounting surface 32 for engagement with the backing plate 18. The body 28 also includes a plurality of apertures 34 for receipt of fasteners such as threaded bolts or screws. In the preferred embodiment, the apertures 34 include a counter sink 36 thereby allowing the installed fastener to rest flush with a bottom surface 38.

The flange 30 extends substantially along the entire length of the body 28 and includes a end face 40 and a locking surface 42 for engagement with the blade insert 24. The locking surface 42 is positioned at an angle relative to the mounting surface 32 to effectively couple the blade insert 24 to the clamp plate 26 after assembly to the backing plate 18. In the preferred embodiment, the locking surface 42 forms a small acute angle 43 with the mounting surface 32 in the range of 3–10 degrees. One skilled in the art will appreciate that the simple geometry of the clamp plate 26 may be created using a variety of cost effective manufacturing methods including roll forming, forging and casting.

Figure 3:
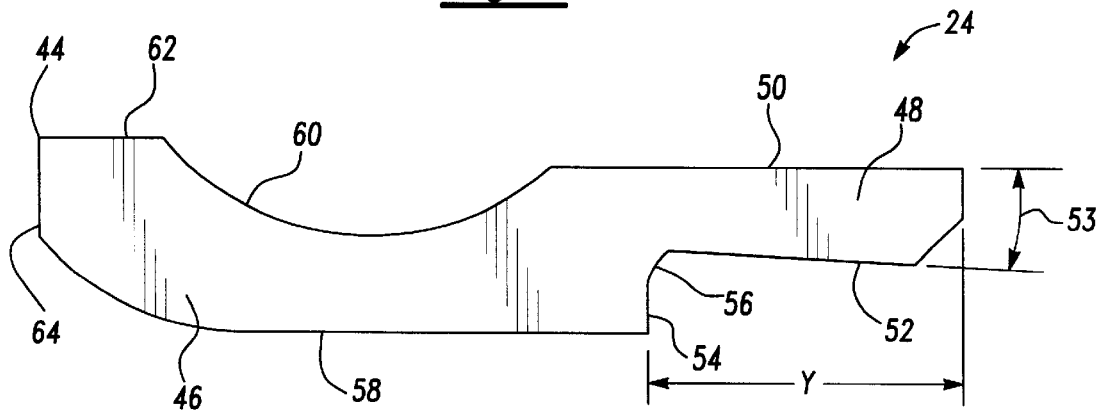
FIG. 3 is a side elevational view of a blade insert of the present invention.

Referring to FIGS. 1 and 3, the blade insert 24 functions to provide a cutting edge 44 in close relation to the helical blades of the cutting reel 14 for cutting grass blades. The blade insert 24 includes a knife end 46 and a tab 48 extending a distance "Y" therefrom. The tab 48 includes a first clamping surface 50 and a second clamping surface 52 extending along the length of the tab 48. It should be appreciated that the first clamping surface 50 and the second clamping surface 52 form an acute angle 53 preferably in the range of 2–9 degrees. Additionally, it should be appreciated that the angle 53 formed by the first clamping surface and the second clamping surface is preferably one degree less than the angle 43 formed between the locking surface 42 and the mounting surface 32 as will be described in greater detail hereinafter. The second clamping surface 52 terminates at a stop face 54. Preferably, the second clamping surface 52 transitions to stop face 54 through a generous radius 56.

The knife end 46 of the blade insert 24 also includes a bottom surface 58 and a relief 60 formed along the entire length of the blade insert 24. In the preferred embodiment, each of the surfaces defining the tab 48 and the body 46 are roll formed to their net shape shown. Accordingly, costly rough machining is eliminated. The body 46 also includes a first machined surface 62 intersecting a second machined surface 64 at the cutting edge 44. Each of the first and second machine surfaces are ground after heat treatment of the blade insert 24 to produce a sharp cutting edge 44.

Figure 4:
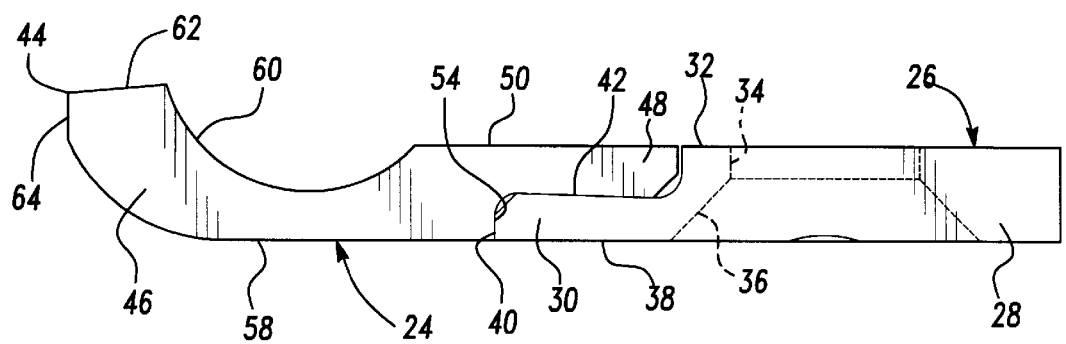
FIG. 4 is a side elevational view of the bed knife blade of the present invention.

Referring to FIGS. 1 and 4, the bed knife blade assembly 10 is assembled to the mower 12 by placing the tab 48 of the blade insert 24 in contact with the flange 30 of the clamp plate 26. Specifically, the flange 30 extends the distance X from the body 28 while the tab 48 extends the lesser distance Y from the first end 46 of the blade insert 24. Accordingly, the end face 40 abuts the stop face 54 once the bed knife blade assembly 10 is coupled to the backing plate 18. One skilled in the art will appreciate that the abutment of end face 40 with stop face 54 assists in maintaining the position of the blade insert 24 relative to the backing plate 18 during operation.

Figure 4A:
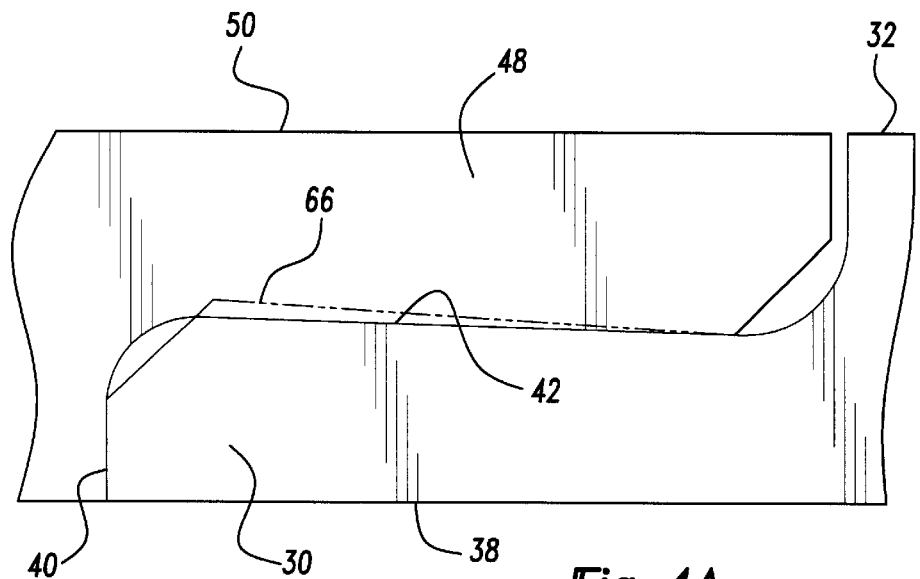
FIG. 4A is an enlarged view of the interconnection of the clamp plate and the blade insert of the present invention.

With specific reference to FIGS. 1 and 4A it should also be appreciated that the locking surface 42 is positioned such that an interference zone 66 (shown in phantom line) is created when the first clamping surface 50 of the blade insert 24 is aligned with the mounting surface 32 of the clamp plate 26 as when clamped against the backing plate 18. The tapered shape of the interference zone 66 in addition to the back angles 43 and 53 tend to bias the blade insert 24 towards the clamp plate 26 thereby closing the gap between the end face 40 and the stop face 54. The clamp plate 26 is coupled to the backing plate 18 with a plurality of fasteners 68 (FIG. 1) disposed within the apertures 34. As the fasteners 68 begin to exert clamping force, each of the tab 48 and the flange 30 compress in an attempt to account for the interference zone 66. In addition, the flange 30 deflects to biasingly load the tab 48 against the backing plate 18. Therefore, once the fasteners 68 have seated the mounting surface 32 against the backing plate 18, the blade insert 24 is fixed in relation to the clamp plate 26.

Figure 5:
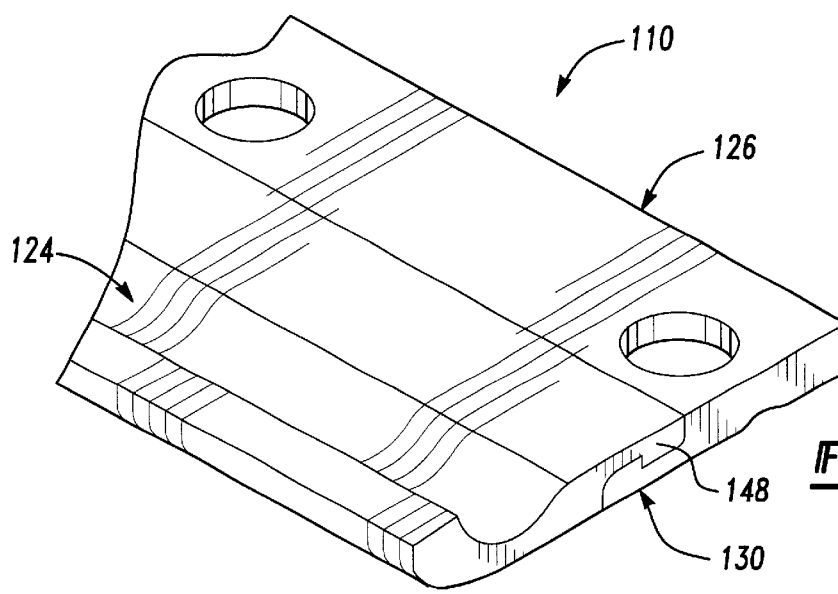
FIG. 5 is a perspective view of a second embodiment of the bed knife blade assembly of the present invention.

Referring to FIG. 5, a second embodiment of the bed knife of the present invention is depicted at 110. It should be appreciated that the second embodiment of the bed knife 110 includes similar components and performs essentially the same function as the first embodiment 10. Accordingly, like elements will be identified with like reference numerals.

Figure 6:
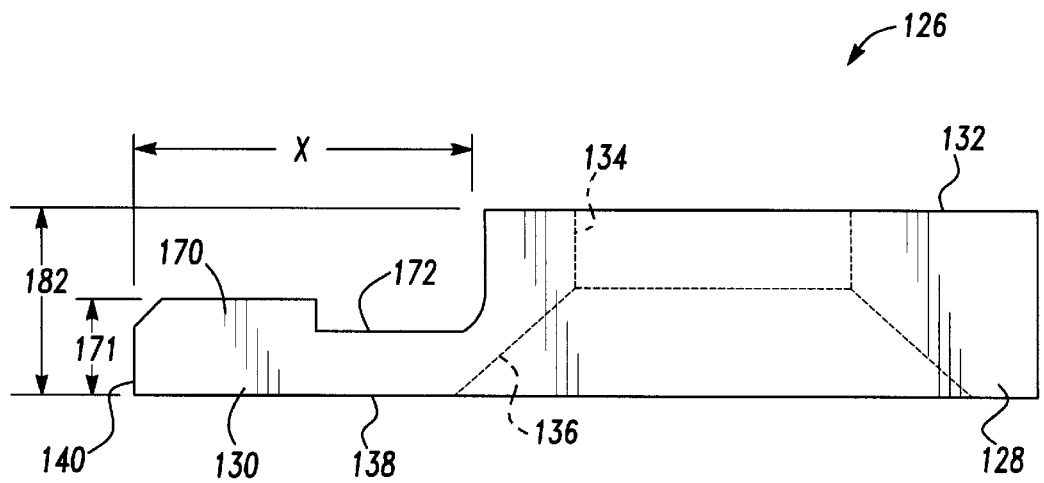
FIG. 6 is a side elevational view of a second embodiment of the clamp plate of the present invention.
Figure 7:
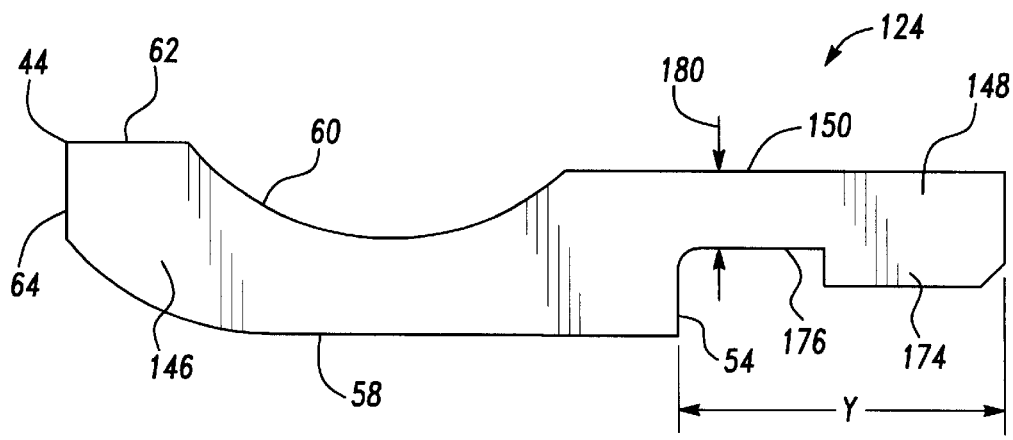
FIG. 7 is a side elevational view of a second embodiment of the blade insert of the present invention.

With reference to FIG. 6, the clamp plate 126 includes a body 128 having a flange 130 extending a distance "X" therefrom. The flange 130 includes a first key 170 extending a distance 171 from the bottom surface 138 of the claim plate 126. A first recess 172 is configured to interlock with a second key 174 and a second recess 176 of the blade insert 124. With reference to FIG. 7, a blade insert 124 includes a knife end 146 and a tab 148 extending a distance "Y" therefrom. As mentioned earlier, the tab 148 includes the second key 174 for disposition within the first recess 172 and the second recess 176 for acceptance of the first key 170. It should be appreciated that the second recess 176 is positioned a distance 180 from the first clamping surface 150 of the blade insert 124. In order to provide the clamping retention feature of the blade insert 124 within the clamp plate 126 the sum of the distances 171 and 180 is greater than the total thickness of the clamp plate 182 (FIG.6). In this manner, the flange 130 will be biasingly loaded against the tab 148 in similar fashion to the first embodiment.

Therefore, it should be appreciated that the configuration and operation of the bed knife blade assembly 10 provides a variety of advantages over the prior art. Specifically, the two-piece construction of the present invention reduces the cost of manufacturing by eliminating several rough machining steps and reducing the quantity of costly high carbon alloy steel. Additionally, a novel interlocking attachment method is used to couple the blade insert to the clamp plate.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A bed knife blade assembly for a reel-type lawn mower having a frame rotatably supporting a cutting reel, said bed knife blade assembly comprising:

a clamp plate having a flange with a locking surface; and a blade insert having a tab cooperating with said locking surface to restrict movement of said blade insert relative to said clamp plate;

wherein said clamp plate is adapted to be coupled to said frame such that said flange biasingly engages said tab to further restrict movement of said blade insert relative to said clamp plate; wherein said tab includes a first clamping surface adapted to be coupled to said frame and a second clamping surface engaging said locking surface, said second clamping surface forming a second angle with said first clamping surface in the range of about three to eleven degrees.

2. The bed knife blade assembly of claim 1 wherein said looking surface engaging said second clamping surface thereby restricting movement of said blade insert.

3. The bed knife blade assembly of claim 1 wherein said clamp plate includes a mounting surface adapted to be coupled to the frame and wherein said locking surface is adapted to trap said tab between said clamp plate and said frame.

4. The bed knife blade assembly of claim 3 wherein said clamp plate defines a first thickness and wherein said tab and said flange cooperate to define a second thickness greater than said first thickness.

5. The bed knife blade assembly of claim 3 wherein said locking surface forms a first angle with said mounting surface in the range of about two to ten degrees.

6. The bed knife blade assembly of claim 2 wherein said first angle is greater than said second angle.

7. A bed knife blade assembly for a reel-type lawn mower having a frame, the bed knife assembly comprising:
   a clamp plate having a body and a flange extending therefrom, said flange defining a first thickness adjacent said body and a second thickness at a terminal end thereof, said second thickness being greater than said first thickness;
   a blade insert having a knife end and a tab extending therefrom; said tab defining a first thickness adjacent said knife end and a second thickness at a terminal end thereof, said second thickness being greater than said first thickness wherein said flange is adapted to be coupled to said frame and biasingly engages said tab to couple said blade insert to said clamp plate.

8. The bed knife assembly of claim 7 wherein said clamp plate includes a tapered locking surface engaged with said tab.

9. The bed knife assembly of claim 8 wherein said tab includes a tapered mounting surface.

10. The bed knife assembly of claim 9 herein said body of said clamp plate defines a plate thickness and wherein the sum of said first thickness of said blade insert and said second thickness of said clamp plate is greater than said plate thickness.

11. The bed knife assembly of claim 7 wherein said flange includes a first key at said terminal end and a first recess adjacent said body and wherein said tab includes a second key at said terminal end and a second recess adjacent said knife end, said first key disposed within said second recess and said second key disposed within said first recess.

12. The bed knife assembly of claim 11 wherein said first key and said second recess sum to a thickness greater than a thickness of said body.

13. The bed knife assembly of claim 12 wherein said clamp plate includes a plurality of fastener apertures to facilitate coupling said clamp plate to said frame.

* * * * *

UNITED STATES PATENT AND TRADEMARK OFFICE
CERTIFICATE OF CORRECTION

PATENT NO. : 6,301,867 B1
DATED : October 16, 2001
INVENTOR(S) : Rickheim

It is certified that error appears in the above-identified patent and that said Letters Patent is hereby corrected as shown below:

Column 5,
Line 1, insert a new paragraph after "plate;".
Line 8, "looking" should be -- locking --.
Line 22, "Claim 2" should be -- Claim 1 --.

Signed and Sealed this

Fifteenth Day of October, 2002

Attest:

Attesting Officer

JAMES E. ROGAN
Director of the United States Patent and Trademark Office